Patented Aug. 1, 1944

2,354,774

UNITED STATES PATENT OFFICE 2,354,774

TERPENE DERIVATIVE

Alfred L. Rummelsburg, Wilmington, Del., assignor to Hercules Powder Company, Wilmington, Del., a corporation of Delaware No Drawing. Application May 31, 1941,
Serial No. 396,220

14 Claims. (Cl. 260—457)

This invention relates to a new class of esters and method of producing the same; and more particularly, it relates to a new class of inorganic esters produced by the esterification of the alcohols obtained by the hydrogenation of a condensation product of an acyclic terpene having three double bonds per molecule with crotonaldehyde.

In accordance with this invention the alcohols employed in carrying out the esterification are those resulting from the hydrogenation of a condensation product of an acyclic terpene having three double bonds per molecule with crotonaldehyde. In this manner, there is obtained a cyclic, primary alcohol which may or may not be saturated depending upon the conditions under which the reaction is carried out.

In preparing the condensation product with crotonaldehyde, any acyclic terpene having three double bonds per molecule, as for example, allo-ocimene, ocimene, myrcene, etc., may be employed. However, allo-ocimene is the preferred material to employ inasmuch as, in addition to having three double bonds per molecule, it has them in a triply conjugated arrangement. Hereinafter, an acyclic terpene having three double bonds per molecule will be referred to for convenience as an acyclic terpene.

Employing any of the aforesaid acyclic terpenes, a condensation product with crotonaldehyde may be prepared. These condensation products are unsaturated, cyclic aldehydes and are obtained in as high as 70% yields by heating the acyclic terpene with an excess of crotonaldehyde at an elevated temperature for several hours. In the reaction which takes place, one molecule of acyclic terpene may react with one molecule of crotonaldehyde or two molecules of the former may react with one of the latter, or vice versa. The extent to which each of these reactions takes place will depend upon the relative proportions of the reactants and the conditions of reaction. Furthermore, during this condensation any of the above compounds or the reactants may polymerize. The compound which will greatly predominate in the reaction mixture, however, will be that formed when one molecule of acyclic terpene condenses with one molecule of crotonaldehyde, particularly so when the latter is used in slight excess.

As an example of this condensation reaction, approximately equi-molar proportions of allo-ocimene and crotonaldehyde may be heated together at 200° C. for say 2.5 hours. The compound representing the combination of equi-molar proportions of the reactants may be separated by vacuum distillation and will be found to be a fairly viscous, yellowish liquid having the following average characteristics:

B. P. (3 mm.)_____°C 117–119
$n_d^{17}$_____1.4952
$d_o^{17}$_____0.9256

It is this compound which is contemplated whenever, hereinafter, use is made of "the allo-ocimene-crotonaldehyde condensate." It may otherwise be referred to as trimethyl butenyl tetrahydrobenzaldehyde. However, if desired, the crude condensate may itself be employed in the practice of this invention, as may any of the compounds separable therefrom.

To form a cyclic, primary alcohol, then, in accordance with my invention, any of the aforesaid condensation products of acyclic terpenes with crotonaldehyde is reduced with hydrogen either with or without the use of a suitable hydrogenation catalyst. Preferably, the condensate resulting when equi-molar proportions of the reactants combine will be employed. It is, however, preferable to use a catalyst inasmuch as greater selectivity is thereby obtainable. It is possible by the use of particular catalysts to hydrogenate only the aldehyde group of the condensate molecule. The product, where "the allo-ocimene-crotonaldehyde condensate" has been employed, is a substitution product of tetrahydrobenzyl alcohol; and more particularly, it is trimethyl butenyl tetrahydrobenzyl alcohol. On the other hand, certain catalysts, in conjunction with the use of relatively high conditions of temperature and pressure, lead to the hydrogenation of the ethylenic double bonds of the molecule as well as the aldehyde group. In this instance, where "the allo-ocimene-crotonaldehyde condensate" has been employed, the product is a substitution product of hexahydrobenzyl alcohol; and more particularly, it is trimethyl butyl hexahydrobenzyl alcohol. The production of these alcohols are described with greater particularity in my copending application for United States Letters Patent, Serial No. 396,216, filed May 31, 1941.

Without regard to selectivity the operable catalysts which may be used include the base metal catalysts, such as, active nickel, Raney nickel, etc., catalysts, the noble metal catalysts, such as, active platinum, palladium, rhodium, osmium, iridium and ruthenium, also active copper chromite catalyst. The quantity of catalyst, if used, may vary up to about 10% of the weight of the acyclic terpene-crotonaldehyde condensate, preferably up to about 5.0%. The foregoing catalysts may be used in unsupported form, or, if desired, supported on suitable inert support materials, such as kieselguhr, diatomaceous earth, etc. The hydrogenation is desirably carried out at temperatures ranging from about 25° C. to about 250° C., depending upon the catalyst, if any, and the degree of hydrogenation desired. The hydrogen pressure may range from about 15 lbs./sq. inch to about 3000 lbs./sq. inch, depending upon the catalyst and the degree of hydrogenation desired. Using active base metal or copper chromite catalysts the preferable pressure range is from about 250 to about 3000 lbs./sq. inch, and the preferable temperatures range from about 100° C. to about 200° C. Using active noble metal catalysts, the preferable pressure range is from about 15 lbs./sq. inch to about 100 lbs./sq. inch, and the preferable temperature range from about 25° C. to about 100° C. Hydrogenation is continued until the desired degree of absorption has occurred and may be carried out in a batchwise or continuous manner.

The purified monomeric saturated alcohol resulting from the hydrogenation of "the allo-ocimene-crotonaldehyde condensate" has been found to have the following average characteristics:

Percent OH ............................................. 7.0–8.5
$n_d^{20°C}$ ............................................. 1.480–1.481
Sp. gr. $\frac{20° C.}{4° C.}$ ......................... 0.915–0.925
B. P. (20 mm.) ........................................ °C. 120–130+

The wide boiling range exhibited is probably due to the presence of various isomeric forms of the alcohol in the product. In comparison with the above, the purified monomeric unsaturated alcohol resulting from the hydrogenation of only the aldehyde group of "the allo-ocimene-crotonaldehyde condensate" has been found to have a boiling point within the range of from 129 to 140° C. at 3 to 5 mm. pressure.

Wherever, hereinafter, a "saturated" alcohol is referred to, there is contemplated any saturated primary alcohol resulting from the complete reduction of any of the acyclic terpene-crotonaldehyde condensates hereinabove discussed; and wherever an "unsaturated" alcohol is referred to, there is contemplated any unsaturated primary alcohol resulting from merely the reduction of the aldehyde group or groups of said acyclic terpene-crotonaldehyde condensates.

By employing the alcohols hereinabove described, and preferably the "saturated" alcohols, the esters of the present invention may be prepared. Various monobasic and polybasic inorganic acids may be utilized. For example, sulfuric, sulfurous, phosphoric, phosphorous, boric, hydriodic, hydrobromic, hydrochloric, hydrofluoric, silicic, etc. acids may be used. In addition, agents other than the above acids may be used equivalently to produce the desired inorganic esters. Thus, the anhydrides of the various inorganic acids, if available, may be employed. Additional agents which will be suitable for the preparation of specific inorganic esters are disclosed infra.

When the esters of polybasic inorganic acids are prepared, they may be acid or neutral, depending upon the procedure employed. Thus, the mono- or dialcohol ester of sulfuric acid may be made, etc. To make a particular acid or neutral ester, the proportion of reactants to be used will depend upon the stoichiometry involved. In the subsequent esterification there may be formed small amounts of esters other than the particular one desired to be produced, but the desired product will predominate.

Where free acidic groups are present in the esters, such as, in the monoalcohol ester of sulfuric acid, and in the mono- and dialcohol esters of phosphoric acid, the products may be neutralized with either organic or inorganic bases. The organic bases which may be employed comprise organic amines, such as, aniline, triethanolamine, morpholin, pyridine, quinoline, cyclohexylamine, trimethylamine, etc. and quaternary bases such as tetramethyl ammonium hydroxide, trimethyl benzyl ammonium hydroxide, etc. The inorganic bases which may be employed comprise the hydroxides, oxides, and carbonates of the alkali metals, the alkaline earth metals, also ammonium hydroxide, ammonium carbonate, etc.

The esterification may be accomplished with or without an inert solvent present. Generally, it is preferable to use an inert solvent inasmuch as the viscosity of the mixture is thereby reduced and more efficient contact results. Furthermore, the inert solvent in many cases enables the use of theoretical amounts of the inorganic acid or other equivalent agent as disclosed supra. Otherwise, the acid or agent must serve as a solvent, and hence a large excess is often necessary. Such an excess is to be avoided if possible, particularly in the preparation of the neutral esters. The inert solvents which may be employed comprise, carbon tetrachloride, ethylene dichloride, ethyl chloride, gasoline, benzene, toluene, xylene, decahydronaphthalene, dimethyl ether, diethyl ether, diisopropyl ether, dichlorodiethyl ether, etc.

In preparing the inorganic esters of this invention, different procedures are employed, depending upon the particular ester it is desired to produce. For example, the sulfate is prepared by reacting either a "saturated" or an "unsaturated" alcohol, hereinabove described, with a sulfating agent such as sulfuric acid, chlorosulfonic acid, sulfur trioxide, acetyl sulfuric acid, etc. at a temperature within the range of from about 0° C. to about 100° C., preferably, within the range of from about 0° C. to about 50° C. A reaction period of from about 0.1 to about 8.0 hours may be used, preferably, from about 0.25 to about 3.0 hours.

To prepare the sulfite, either a "saturated" or an "unsaturated" alcohol is reacted with a sulfiting agent such as sulfurous acid, thionyl chloride, etc. at a temperature within the range of from about 0° C. to about 60° C., preferably, within the range of from about 25° C. to about 35° C. Reaction periods of from about 0.5 to about 24.0 hours, preferably, from about 2.0 to about 8.0 hours may be employed. If desired, pyridine may be present during the reaction to absorb the hydrochloric acid evolved. In the purification of the product, it is desirably rapidly water washed to prevent hydrolysis of the ester.

The phosphate esters are prepared by reacting either a "saturated" or an "unsaturated" alcohol with phosphating agents such as orthophosphoric acid, phosphorus pentoxide, tetraphosphoric acid, etc., or their mixtures. Preferably, when orthophosphoric acid is employed, it should be of 100% strength. In addition, phosphate esters may be produced by reacting phosphorus oxychloride with the alcoholate resulting from the reaction of an alkali metal with one of the aforesaid alcohols. The reaction temperature which may be used to produce the phosphates may range from about 25° C. to about 200° C., preferably, from about 25° C. to 100° C. The reaction time may range from about 0.5 to about 8.0 hours; preferably, it will be 3.0 hours or less.

In preparing the trialcohol ester, in particular, of phosphoric acid, it is preferred to first react an alkali metal with either a "saturated" or "unsaturated" alcohol to obtain the corresponding alkali metal alcoholates. The alcoholate is then reacted with the stoichiometrically required amount of phosphorus oxychloride at a temperature within the range of from about 10 to about 150° C., preferably, within the range of from about 30 to about 60° C. for a reaction period of from about 0.5 to about 12.0 hours, preferably, from about 1.0 to about 4.0 hours. Desirably, the alkali metal alcoholate will be employed in solution in an inert solvent such as benzene, gasoline, toluene, carbon tetrachloride, etc. Following the reaction period, precipitated alkali metal chloride is removed by filtration, water washing, or any other suitable method. Thereafter, the solvent will be removed, for example, by vacuum distillation. In carrying out the above reaction, pyridine may be present, however, it is preferred to exclude it from the reaction mixture.

Phosphite esters may be prepared using procedures similar to those used in making the phosphate by employing phosphorous acid in place of orthophosphoric or by employing phosphorus trichloride in place of phosphorus oxychloride.

The borate esters of the "saturated" or "unsaturated" alcohols hereinabove described may be prepared by reaction with boric acid, boric anhydride, acetyl boric acid, etc. Another method involves the reaction of an alkali metal alcoholate with boron trichloride in the presence of pyridine. Of the aforesaid agents, the use of boric anhydride is preferred. The reactions may be carried out at temperatures within the range of from about 80 to about 200° C., preferably, within the range of from about 100° C. to about 150° C., and for a period of from about 6.0 to about 24.0 hours, preferably, from about 10.0 to about 15.0 hours.

In accordance with the processes of the present invention, the resulting product, if it is an acid ester, may be neutralized by adding the required amount of aqueous inorganic base. The aqueous base may vary from about 10% to about 50% base in concentration. As heretofore described, the neutralization may be accomplished by adding the required quantity of organic base. Following the neutralization, the solvent is removed, preferably by distillation in vacuo, during which the temperature is preferably held below 125° C.

Where the inorganic esters of this invention are formed without the use of an inert solvent but with the use of an excess of inorganic acid or other agent, various methods may be employed to remove the excess reactant. For example, when the sulfate is prepared with a large excess of concentrated sulfuric acid, the reaction mixture may be carefully diluted with ice and/or cold water to about 40 to 50% sulfuric acid strength, with agitation. The sulfate thereby precipitates and may be separated. It may then be dissolved in water and neutralized with the required amount of inorganic or organic base. The neutralized ester may be separated from the solution by means of the addition of a suitable inorganic salt, such as NaCl, Na2SO4, NaNO3, etc., or their concentrated aqueous solutions. The ester may then be dried, preferably by heating to a temperature not above 125° C. in vacuo.

As illustrative of the practical production of esters in accordance with this invention, the following examples are given. All parts and percentages are by weight unless otherwise specified.

*Example 1*

Fifty parts of a saturated alcohol obtained by the complete reduction of "the allo-ocimene-crotonaldehyde condensate," having a hydroxyl content of 6.8%, were dissolved in 150 parts of CCl4 and sulfated with 32 parts of ClSO3H. The acid was added over a period of about 20 minutes with vigorous agitation at a temperature of 20° C. to 25° C., and the agitation was continued thereafter for a period of 0.75 hour at 25° C. The mixture was neutralized with 130 cc. of 20% NaOH at 20 to 30° C. to an end point using phenolphthalein as indicator. The carbon tetrachloride was evaporated by heating at 100° C. The residue was dried in vacuo at 85° C. for a period of 24 hours. Forty-eight parts of product resulted in the form of a light-colored powder. This powder was water-soluble and had wetting, sudsing, and detergent action in water. The product acted as an emulsificant for pine oil and water.

*Example 2*

Five hundred parts of the same saturated alcohol as employed in Example 1, having a hydroxyl content of 7.0%, were heated at 150 to 200° C. with 49 parts of sodium metal with agitation for a period of about 6 hours. The resulting sodium alcoholate was added to a solution of 110 parts of phosphorus oxychloride in 2000 parts of narrow range gasoline (B. P. 90 to 130° C.) with agitation. The reaction mixture was agitated under reflux to about 80° C. for a period of 4 hours, then cooled, and the precipitated NaCl removed by water washing. The gasoline solution was dried and the solvent removed by vacuum distillation. A solid product resulted which was nearly neutral.

*Example 3*

Two hundred and fifty parts of the same saturated alcohol as employed in Example 1, having a hydroxyl content of 8.0%, was dissolved in 150 parts of xylene and heated with 28 parts of boric anhydride with vigorous agitation at 130° C. for a period of 15 hours. The reaction mixture was rapidly water washed to prevent hydrolysis, dried with anhydrous sodium sulfate, and the solvent removed by vacuum distillation. The product was a resinous solid.

*Example 4*

One hundred parts of the same saturated alcohol as employed in Example 1, having a hydroxyl content of 8.0%, was added slowly over a period of 0.5 hour and at 25 to 30° C. to 200 parts of 100% orthophosphoric acid in which there had been dissolved 25 parts of P2O5. The reaction mixture was agitated at 30 to 40° C. for about 0.5 hour, and then diluted with 200 parts of cracked ice with agitation. The solid ester which separated was washed with aqueous 15% NaCl, then dissolved in 500 parts of water at 65° C. and neutralized with aqueous 20% NaOH. About 75 parts of aqueous 15% NaCl solution were added with agitation. The precipitated neutralized ester was dried in vacuo at about 70° C. The solid product was water-soluble and gave a water solution which foamed upon shaking.

*Example 5*

One hundred parts of the same saturated alcohol as employed in Example 1, having a hydroxyl content of 8.0%, were dissolved in 200 parts of petroleum ether and the resulting solution admixed with 29 parts of thionyl chloride with agitation at 20 to 30° C. Hydrochloric acid was evolved. After standing at 30° C. for 6 hours, the solution was warmed to 60° C. and held there for ½ hour. Traces of thionyl chloride and solvent were removed by vacuo distillation, holding the bath temperature below 60° C. The product was a viscous oil.

The inorganic esters contemplated by this invention have emulsifying, wetting and sudsing properties. Many of these acid esters have, in addition, detergent action in water solution. In particular, the neutral esters of the "saturated" alcohols with phosphoric acid may be used as plasticizers for cellulose nitrate, cellulose acetate, mixed cellulose ester, ethyl cellulose, chlorinated rubber, etc. In addition, they may be used as rust inhibitors in protective coatings. The borate esters of the invention function as deterrents in smokeless powder manufacture.

It will be understood that the details and examples hereinbefore set forth are illustrative only and that the invention as broadly described and claimed is in no way limited thereby.

The application constitutes a continuation-in-part of my application for United States Letters Patent, Serial No. 382,750, filed March 11, 1941.

What I claim and desire to protect by Letters Patent is:

1. The method of producing a new composition of matter which comprises heating to the reaction temperature an inorganic acid with a primary alcohol resulting from the hydrogenation of a condensation product of an acylic terpene having three double bonds per molecule with crotonaldehyde.

2. The method of producing a new composition of matter which comprises reacting in the presence of heat an inorganic acid with a primary alcohol resulting from the hydrogenation of an allo-ocimene-crotonaldehyde condensate.

3. The method of producing a new composition of matter which comprises reacting chlorosulfonic acid with a trimethyl butyl hexahydrobenzyl alcohol.

4. The method of producing a new composition of matter which comprises reacting phosphoric acid with a trimethyl butyl hexahydrobenzyl alcohol.

5. The method of producing a new composition of matter which comprises reacting chlorosulfonic acid with a trimethyl butyl hexahydrobenzyl alcohol at a temperature within the range of from about 0° C. to about 100° C.

6. The method of producing a new composition of matter which comprises reacting phosphoric acid with a trimethyl butyl hexahydrobenzyl alcohol at a temperature within the range of from about 25° C. to about 200° C.

7. An ester of an inorganic acid and a substituted benzyl alcohol having the formula R—$CH_2OH$ in which R is a substituted phenyl radical selected from the group consisting of a trimethyl-butenyltetrahydrophenyl and a trimethyl-butylhexahydrophenyl.

8. An ester of an inorganic acid and a substituted benzyl alcohol having the formula R—$CH_2OH$, in which R is a trimethyl-butyl-hexahydrophenyl radical.

9. An ester of an inorganic acid and a substituted benzyl alcohol having the formula R—$CH_2OH$, in which R is a trimethyl-butenyl-tetrahydrophenyl radical.

10. An ester of an inorganic polybasic acid and a substituted benzyl alcohol having the formula R—$CH_2OH$, in which R is a trimethyl-butyl-hexahydrophenyl radical.

11. An ester of an inorganic polybasic acid and a substituted benzyl alcohol having the formula R—$CH_2OH$, in which R is a trimethyl-butenyl-tetrahydrophenyl radical.

12. An ester of sulfuric acid and a substituted benzyl alcohol having the formula R—$CH_2OH$, in which R is a trimethyl-butyl-hexahydrophenyl radical.

13. An ester of phosphoric acid and a substituted benzyl alcohol having the formula R—$CH_2OH$, in which R is a trimethyl-butyl-hexahydrophenyl radical.

14. An ester of sulfuric acid and a substituted benzyl alcohol having the formula R—$CH_2OH$, in which R is a trimethyl-butenyl-tetrahydrophenyl radical.

ALFRED L. RUMMELSBURG.